United States Patent [19]

Fukuda et al.

[11] 4,247,675
[45] Jan. 27, 1981

[54] POLYURETHANE RESINS AND POLYURETHANE RESIN COATING COMPOSITIONS

[75] Inventors: Tadanori Fukuda, Otsu; Sadayuki Sakamoto, Shiga; Masami Saito, Otsu, all of Japan

[73] Assignee: Toray Industries, Inc., Tokyo, Japan

[21] Appl. No.: 66,407

[22] Filed: Aug. 14, 1979

[51] Int. Cl.$^3$ .............................................. C08G 18/00
[52] U.S. Cl. ................................ 528/44; 260/31.2 R; 260/31.6; 260/33.2 R; 260/33.4 UR; 260/33.6 UB; 528/84
[58] Field of Search ............ 528/84.44; 260/33.6 UB, 260/31.2 R, 31.6, 33.2 R, 33.4 UR

[56] References Cited

U.S. PATENT DOCUMENTS

| | | | |
|---|---|---|---|
| 3,236,812 | 2/1966 | McElroy | 528/84 |
| 3,383,400 | 5/1968 | Meisert et al. | 528/84 |
| 3,397,253 | 8/1968 | Merten et al. | 528/84 |
| 3,503,932 | 5/1970 | Reuter | 528/84 |
| 3,567,763 | 3/1971 | Emmons et al. | 260/478 |
| 3,684,769 | 8/1972 | Abbott et al. | 528/84 |
| 4,001,290 | 1/1977 | Wagner et al. | 528/44 |

FOREIGN PATENT DOCUMENTS 1229067 11/1966 Fed. Rep. of Germany ............. 528/84
1244769 7/1967 Fed. Rep. of Germany ............. 528/44

*Primary Examiner*—William F. Hamrock
*Attorney, Agent, or Firm*—Miller & Prestia

[57] ABSTRACT

Polyurethane resins with an excellent weather resistance are provided by the reaction of polyols with trifunctional isocyanates which are expressed by the following general formula:

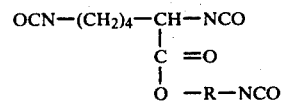

(R = a remnant of divalent hydrocarbon group with carbon number of 2 or 3)

The reaction between a polyol and a trifunctional isocyanate is effectuated at an NCO/OH mole percentage of 0.5 to 2.0, and adjustments are made so that the concentration of carbamide group will be $5 \times 10^{-4}$ to $50 \times 10^{-4}$ moles per gram of the reaction product, and that the bridging parameter will be 150 to 1,500.

The resins may be used to best advantage as polyurethane resin coatings excelling in weather resistance.

12 Claims, No Drawings

POLYURETHANE RESINS AND POLYURETHANE RESIN COATING COMPOSITIONS

BACKGROUND OF THE INVENTION

1. Field of the Invention

The present invention relates to polyurethane resins which are beneficial as material producing a polyurethane resin coat with, in particular, an excellent weather resistance.

2. Description of the Prior Art

Polyurethane resins are classified into two types by the kind of isocyanate compounds contained in them—the "yellowing" and "non-yellowing" types. Isocyanates which have hitherto been in use as ones giving polyurethane resins of the non-yellowing type include: such aliphatic isocyanates as hexamethylenediisocyanate, isophoronediisocyanate, 2,2,4-trimethylhexamethylenediisocyanate, dicyclohexylmethanediisocyanate, etc.; and xylilenediisocyanate, etc. Whilst non-yellowing type polyurethane resins obtained by causing these isocyanates to react with polyols have been employed as coating materials, there still remained many problems to be solved in using them for such purpose.

One of the problems is their toxicity. Since isocyanate compounds are substances which are chemically highly reactive, they are very dangerous when used by persons who are of an allergic constitution or have weak respiratory organs. Because of this, the limit of concentration in the atmosphere of, for instance, monomers of toluenediisocyanate, diphenylmethanediisocyanate, etc., was fixed at 0.02 ppm by the Commission of the American Conference of Governmental Industrial Hygienists. For such reason, for one thing, the aforesaid isocyanate monomers are seldom used as they are in polyurethane coatings, except in special cases, but are generally used after having been modified into prepolymers—adducts obtained by adding them to trimethylolpropane, ethylene glycol, etc. This modification has the effect of lowering vapor pressure, thereby reducing toxicity and bad odor, and, in addition, of allowing the adjustment of reactivity to be made and the diversification of the type of coatings to be realized.

Since, however, it is industrially extremely difficult to wholly eliminate isocyanate monomers in the prepolymer additions, the fact is still that one smells a strong irritating odor while he is engaged in the work of preparing coating materials or of applying coats, many people complaining of the symptoms of respiratory diseases peculiarly contracted by inhaling isocyanate vapor, and with an increase in the use of polyurethane products, this question has been brought much to the fore.

With the isocyanate additions, in particular, it is said that there occurs dissociation of diisocyanates—highly toxic monomers—while they are in store, depending upon the storage conditions, and this constitutes an uneasy factor for those concerned—chemical engineers and operators. Under such circumstances, measures are being taken for improvement of the working environment, ensuring a good ventilation, for instance, so that the operators will not directly inhale vapor of isocyanate compounds. However, the state of things in this connection is still far from being satisfactory.

The second question in the conventional technology is that there remains, with the conventional coatings, much to be desired in respect of their weather resistance. Although the non-yellowing type polyurethane resins were originally developed with a view to improving the weather resistance of coatings, they are not, as yet, sufficiently resistant to weather when used as coating for application to those commodities which are exposed to severe conditions outdoors over a long period of time, such as automobiles, railroad carriages, aircrafts, vessels, building materials, and so forth.

The third question concerning polyurethane coating materials according to the conventional techniques is that the range in which the selection of solvent composition can be made is not necessarily wide enough, and that, if the amount of solvent is reduced from the viewpoint of energy saving and prevention of environmental pollution, the resultant product being the so-called "high solid type" coating with a high concentration of polyurethane resin, the coating work efficiency is much impaired because of its high viscosity.

SUMMARY OF THE INVENTION

The main object of the present invention is to provide polyurethane resins and polyurethane resin coatings having a high resistance to weather.

Another object of this invention is to provide polyurethane resin coating compounds affording an improved coating work efficiency.

Still other objects of the present invention will become clear from the description to follow.

A polyurethane resin film coat with an excellent weather resistance is provided by the present invention. This film coat has for its main ingredient a polyurethane resin which is a reaction product obtained by causing (A) a polyol to react with (B) a trifunctional isocyanate expressed by the following general formula:

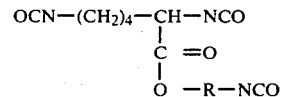

(R = a remnant of divalent hydrocarbon group with the carbon number of 2 or 3)

at an NCO/OH mole percentage of 0.5 to 2.0, and of which the concentration of carbamide group is $5 \times 10^{-4}$ to $50 \times 10^{-4}$ moles per gram of said reaction product, and the bridging parameter 150 to 1,500.

DESCRIPTION OF THE PREFERRED EMBODIMENTS

A polyol as referred to in the present invention means a compound or polymer containing two or more hydroxyl groups per molecule.

As examples of polyols, there are diols, triols, tetraols, pentols and hexitols; while there are also such polymer polyols as polyester containing two or more hydroxyl radicals per molecule (hereinafter called "polyester polyol"), polyether containing two or more hydroxyl groups per molecule (hereinafter called "polyether polyol"), acrylic polymer containing two or more hydroxyl radicals per molecule (hereinafter called "polyacryl polyol"), etc. In the present invention, these may be used either singly or as a mixture of two or more kinds. Hereunder are given further examples, in more particulars, of polyols.

Diols:

ethylene glycol, propylene glycol, β-β'-dihydroxydiethyl ether (diethylene glycol), dipropylene glycol, 1,4-butylene glycol, 1,3-butylene glycol, polyethylene glycol, polypropylene glycol, polpropylene-polyethylene glycol, polybutylene glycol;

Triols:
glycerine, trimethylol propane, 1,2,6-hexanetriol;

Tetraols:
penta erythritol, 2-methylglucoside;

Hexitol:
sorbitol;

Polyester polyols:
These are polymerized by the condensation reaction between a polybasic acid, such as adipic acid, dimer acid, phthalic anhydride, isophthalic acid, etc., and a diol or triol, such as ethylene glycol, diethylene glycol, propylene glycol, trimethylol propane, glycerine, etc.

Polyether polyols:
These are prepared by adding propylene oxide, ethylene oxide, or the like, to a polyhydric alcohol, such as glycerine, propylene glycol, etc. In this category are also included polyether polyols rich in hydroxyl radicals obtained by causing a multifunctional compound such as ethylenediamine, ethanolamine, etc. to react with ethylene oxide or propylene oxide.

Polyacryl polyols:
Copolymers of an acrylic acid ester or methacrylic acid ester containing a hydroxyl group expressed by the following general formula:

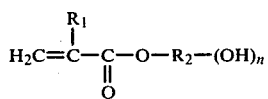

wherein
n = 1, 2 and 3
$R_1$ = hydrogen or methyl
$R_2$ = a remnant radical of substituent or nonsubstituent hydrocarbon with the carbon number of 2 to 12
and a monomer which is capable of being copolymerized with such.

Hereunder are enumerated examples of acrylic acid esters or methacrylic acid esters containing the aforesaid hydroxyl group.

2-hydroxyethyl acrylate, 2-hydroxypropyl acrylate, 2-hydroxybutyl acrylate, 2-hydroxyethyl methacrylate, 2-hydroxypropyl methacrylate, 3-hydroxypropyl methacrylate, 4-hydroxybutyl methacrylate, 2-hydroxypentyl methacrylate, methacrylic acid monoester of glycerine, acrylic acid or methacrylic acid monoester of trimethylol propane, 2-hydroxy-3-chloropropyl acrylate, 2-hydroxy-3-chloropropyl methacrylate, etc.

Out of these, the most desirable are: 2-hydroxylethyl methacrylate, 2-hydroxyethyl acrylate and 2-hydroxypropyl methacrylate. In the next place, examples of monomers which are capable of being copolymerized with the abovementioned acrylic acid or methacrylic esters containing a hydroxyl group are given below.

(1) acrylic acid or its esters, for example, acrylates of methyl, ethyl, propyl, butyl or 2-ethylhexyl (2) methacrylic acid or its esters, for example, methacrylates of methyl, ethyl, butyl, decyl, 2-ethylhexyl or lauryl (3) styrene or its derivatives, for example, α-methylstyrene, β-chlorostyrene, etc.

(4) vinyl esters, for example, vinyl acetate, vinyl propionate, vinyl isopropionate, etc.

(5) nitriles, for example, acrylonitrile, methacrylonitrile, etc.

Out of these, the most desirable are: methyl acrulate, ethyl acrylate, butyl acrylate, methyl methacrylate, butyl methacrylate, lauryl methacrylate, acrylic acid, methacrylic acid, styrene, acrylamide, vinyl acetate, etc.

To prepare polyacryl polyols best suited for the purpose, it is desirable that the amount of each monomer used be selected from the following ranges:

(A) Hydroxyalkyl(meth)acrylate ... 5 to 30 pct. by wt.
(B) Alkyl ester of acrylic acid and/or of methacrylic acid ... 50 to 95 pct. by wt.
(C) Other monomer(s), as occasion demands ... 0 to 50 pct. by wt.
(D) Acrylic acid or methacrylic acid ... 0 to 10 pct. by wt.

If, of the foregoing, the amount of hydroxyalkyl(meth)acrylate is less than 5 pct. by wt., the degree of bridging by reaction with isocyanate compounds becomes too small and hence it will be impossible to obtain a film coat with such performance as was expected.

While the manufacture of polyacryl polyols by copolymerization of monomers, as described above, may be carried out by any one of such known methods of polymerization as solution, block, emulsion and suspension polymerization, the first mentioned method, i.e., solution polymerization is generally employed.

Selection of polyols may be made at one's discretion so as to fit the purpose, but, in general, the use of polyester polyols or polyacryl polyols is preferable.

As for the molecular weight of polyols used, too, selection may be made from quite a wide range according to the purpose. For the "high solid type" coating, however, a range of 500 to 5,000, especially, 500 to 3,000, is preferred. More particularly, when polyester polyols are used, those with a molecular weight in the range of 500 to 1,000 are best suited for the purpose; while when polyacryl polyols are used, those with a molecular weight in the range of 1,000 to 3,000 may be utilized to best advantage. When manufacturing coatings which are not of the "high solid type", polyols with a molecular weight higher than ordinary are employed.

The trifunctional isocyanate compounds employed in the present invention are those expressed by the general formula previously given in this specification, of which typical examples include:

2,6-diisocyanate caproic acid -β-isocyanate ethyl ester; 2, 6-diisocyanate caproic acid -γ-isocyanate propyl ester; 2,6-diisocyanate caproic acid -2-methyl-β-isocyanate ethyl ester; etc.

All these can be manufactured by causing an ester of lysine and aminoalcohols to react with phosgene.

Here, it is difficult to achieve polymerization if, in the aforesaid general formula, the carbon number of R is 1; while if the carbon number is 4 and over, the content of isocyanate in the trifunctional isocyanates becomes too small, and this will be detrimental to the physical properties of polyurethane resin film obtained by the reaction with polyols, and will, besides, make the viscosity of the trifunctional isocyanate compounds higher, thus making the product unsuitable for the purpose of this invention.

By making a proper choice of polyols to be used and by adjusting the NCO/OH mole percentage, the physical properties and hence efficiency of the product, such as the strength of film coat, flexibility, chemical resistance, solvent resistance, etc., can be modified in a wide range, thereby to make it suitable for specific purposes.

Compounds of which the NCO/OH mole percentage is in the range of 0.5 to 2.0 are suited for the manufacture of films and for the application of film coat. For polyurethane coatings, in particular, the range of 0.5 to 1.2 is preferred.

If the NCO/OH mole percentage is below the lowest figure, as above, hot water and acid resistance of the film coat produced is lowered, resulting in a poorer weather resistance. When it is above the highest figure, too, there takes place a lowering of weather resistance.

Those with an NCO/OH mole percentage in the range of 0.5 to 1.0 may be used to advantage for such fields as electrical insulation, capsulation, and manufacture of cast products.

When the NCO/OH mole percentage is in the range of 0.1 to 0.7, such compounds may be advantageously utilized for the manufacture of highly efficient adhesives or hardening agents. When, on the other hand, the NCO/OH mole percentage is greater, such compounds are suited for the manufacture of foam products. The foaming may be achieved by introducing a certain fixed amount of water or a blowing agent into the reaction products, by utilization of the known techniques of foaming.

It is necessary that the concentration of the carbamide contained in the product of reaction between a polyol and a trifunctional isocyanate be in the range of $5 \times 10^{-4}$ to $50 \times 10^{-4}$ moles per gram of said reaction product. The term "carbamide radical" as herein used indicates a group expressed by this:

$$-NH-\overset{O}{\underset{\|}{C}}-.$$

which exists in the urea bond, urethane bond, biuret bond and allophanate bond. In an IR analysis, the existence of this carbamide radical can be confirmed from a peak somewhere around 1530 cm$^{-1}$. If the concentration of the carbamide radical is lower than the above, it is impossible to obtain a film coat which excels in durability, pliability, solvent and chemical resistance, adhesive power, etc. If, on the other hand, the concentration is higher than the above, a film coat produced will have a poorer weather resistance.

It is necessary that the bridging parameter E (calculated value) of the aforesaid reaction products be in the range of 150 to 1,500. If it is lower than this lower limit, the pliability of a film coat obtained will be very poor. If, on the other hand, it is higher than the upper limit, a film coat with a good durability cannot be obtained, here, the bridging parameter $E_c$ indicates a parameter so defined by T. C. Patton (Off. Digest, 34-446, 348 '62), as hereunder given, viz.:

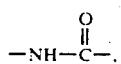

wherein
$W_1$ = weight of polyol;
$W_2$ = weight of isocyanate;
$F_1$ = degree of functioning of polyol;
$F_2$ = degree of functioning of isocyanate;
$C_1$ = degree of bridging function of polyol, $C_1 = F_1 - 2$;
$C_2$ = degree of bridging function of isocyanate, $C_2 = F_2 - 2$;
$E_1$ = equivalent weight of polyol; and
$E_2$ = equivalent weight of isocyanate.

The polyurethane resin coating of the present invention is adaptable to both the one-component and two-component types, but it is more advantageous to use it as the two-component type coating.

(1) Two-Component, Polyol Hardening Type

This is a two-component type polyurethane resin coating constituted of a kneaded mixture of a polyol and a pigment, the latter being added at need ("A" liquid) and a trifunctional isocyanate of the present invention, diluted with a solvent as needs be ("B" liquid). At use, "A" and "B" liquids are mixed together and, when necessary, the viscosity is adjusted by the use of a thinner. For mixing the two liquids, a two-liquid gun may preferably be employed. It is desirable that the mixing ratio be determined in such a manner that the NCO/OH mole percent will be 0.5 to 2.0, concentration of carbamide radical $5 \times 10^{-4}$ to $50 \times 10^{-4}$ moles per gram of the reaction product, and briding parameter 150 to 1,500.

The solvent of "B" liquid and the thinner of the mixture, which are used at need, may be either the same or different; but, in the latter case, it is necessary that the two are compatible with each other. Further, these must not be ones which are reactive with isocyantes and polyols, such as ones containing active hydrogen atoms. Some examples of solvents that may be used are given below.

Hydrocarbon solvents:
  benzene, toluene, xylene, and aromatic naphtha.
Ester solvents:
  ethyl acetate, butyl acetate, cellosolve, hexyl acetate, amyl acetate, ethyl proprionate, and butyl proprionate.
Ketone solvents:
  acetone, methyl ethyl ketone, methyl isopropyl ketone, methyl isobutyl ketone, diethyl ketone, and cyclohexanone.
Glycol ester solvents:
  ethylene glycol monoethyl ether acetate, and diethylene glycol monoethyl ether acetate.

One of the characteristics of the present invention lies in that, of the whole composition of solvent, more than 50 pct. by wt. can be the aforesaid hydrocarbon solvent.

Further, the amount of solvent in the aforesaid "B" liquid can be as small as 0 to 50 pct. by wt., and this also constitutes a characteristic of the coating in accordance with the present invention. This makes it easier to obtain a "high solid type" coating—a contributing factor to an improvement of the outward appearance of film coats.

As for polyols to be used, those which were previously mentioned, that is, polyester polyols, polyether polyols, polyacryl polyols, etc., are recommended. These are certain to give good results.

By combining proper kinds of polyols and isocyanate compounds, it is possible to obtain coats of varied properties, from soft to hard and tough ones, all of which being possessed of an excellent resistance to weather, water, chemicals and stain. Coatings of this type are ordinarily used at temperatures ranging from room temperature to 120° C. They display an excellent adhesive property when used for coating of such materials as ferrous and nonferrous metals, plastics, rubber, leather, concrete, etc., and hence have a wide range of applications in such fields of industries as manufacture of building materials, automobiles, machines and instruments, and woodworks; building of aircrafts, railroad carriages and ships; and so forth.

(2) One-Component, Heat Curing Type

With coatings of the two-component, polyol hardening type which has been described in the foregoing, the reaction progresses even at room temperature; hence there frequently arise cases where the pot life of coatings in use presents a problem.

In this type of coating, one-liquid, heat curing type, the isocyanate group of isocyanate compounds is once blocked by the addition of a blocking agent so that the coating will be stable at room temperature. The coating, after having been applied, is heated to dissociate the blocking agent. The isocyanate group is thus activated again and is caused to react with the hydroxyl group to form a film coat. This method is best suited for such applications as coating of automobiles on a manufacturing line, or the like, where it is necessary to ensure stability of coating materials while they are in store at room temperature.

As polyols to be combined with the blocked type isocyanate prepolymer, polyester polyols and polyacryl polyols may be used to best advantage.

As blocking agents for the purpose of masking free isocyanate radical of the trifunctional isocyanate compounds used in the present invention, those which are in general use may be brought into employment. Hereunder are given some examples of such blocking agents:

Phenol, m-nitrophenol, p-chlorophenol, catechol, ethyl malonate, acetylacetone, ethyl acetoacetate, cresol, ε-caprolactam, methyl ethyl ketoxime, cyclohexanoneoxime, butyl mercaptan, methanol, ethanol, ethylene, chlorohydrin, etc.

Although the temperature at which the above-mentioned blocking agents are dissociated varies with the kind of such agents, it is generally accepted that heating to at least 120° C. is required. Since the coating of this type thus requires baking at a relatively high temperature, it has hitherto been in use mainly in such fields as the manufacture of electric wires, etc. It is expected, however, that there will be new developments in its utilization, such as adaptation to a powder paint with polyurethane resin base, to an aqueous emulsion paint, and so forth.

Solvents for this type of coating, which are used as occasion demands, are identical with those in the case of the two-component type coatings. In this instance, too, more than 50 pct. by wt. of the whole composition of solvents can be hydrocarbon solvents.

The coating compounds according to the present invention can be applied to articles to be coated in an ordinary method of coating, such as spray, brush or roller coating, or dipping. It also permits the use of commonly used pigments and plasticizer, or other kind of additives which are used in small amounts when preparing the paint or when applying it, provided that the amount used is within the limit of the common practice. For the choice of pigments, it is necessary to pay attention to their water content, as well as to their properties like in the case of selecting solvents. It is to be noted that extenders, in particular, have a great water adsorbability.

Catalysts may also be used to quicken drying and hardening. For instance, such tertiary amines as dimethylethanolamine, triethylenediamine, etc., and such organic salts of tin as stannous, dibutyl tin dilaurate, etc., may be employed.

The characteristics of the coating according to this invention are as follows:

(1) It excels in gloss retention and anti-cracking properties.

(2) It has an excellent resistance to acid and water. It is thought that, besides this comes from the fact that it hardens very quickly after application, such property is closely related to the network-like structure of the coat produced by hardening with the trifunctional isocyanate compound used in the present invention.

(3) It facilitates an improvement in the outward appearance of the coat.

Whilst the luster and build of a coat are related to various factors, the influence of the coating on the under coat is a factor which must not be left unheeded. With the compounds of this invention, it is possible to use a variety of solvents and, in particular, much of aromatic compound solvents. This permits lessening the influence of the coating on the under coat, for instance, primer surfacer; that is the permeation of the solvent is kept to the minimum, helping to achieve an improvement in the outward appearance of the coat. Thus, it is best suited for such purposes as coating of automobiles, etc., where an emphasis is placed on a good outward appearance.

(4) It contributes to development of coatings of the "high solid type".

Amidst the recent moves for restriction on environmental pollution, the development of polyurethane resin coatings of the "high solid type" or of the solventless type is attracting much attention of the circles concerned. Isocyanate as an ingredient of such coatings is required to have, like the polyol ingredient, a low viscosity at room temperaure. As the trifunctional isocyanate used in the present invention has a low molecular weight, it has a low viscosity, hence may be intended for the manufacture of coatings that will help to prevent environmental pollution. It is also possible, by proper choice of polyols, to manufacture solventless coatings and thus to contribute to savings in resources or energy. The coating of the present invention is, because of its low viscosity, excellent in respect of coating work efficiency, too.

(5) Hardening speed is great.

Although the hardening speed at room temperature is not so clearly different from that of coating materials on the market, it becomes considerably greater than the latter with the rise of baking temperature. Thus, it is possible to shorten the time required for curing.

(6) Low toxicity.

Hexamethylenediisocyanate prepolymers or adducts have, in general, a pretty strong irritating odor. This is because, it is said, of the existence of a very small amount of hexamethylenediisocyanate monomers in the prepolymers or adducts. With, on the other hand, the trifunctional isocyanate compounds employed in the present invention, the vapor pressure is remarkably low, and there is, while they are being kept in store, no liberation of volatile ingredients with high toxicity. Also, their NCO content is higher than that of coating materials on the market. Therefore, the coating of this invention emits little irritating odor which is peculiar to the isocyanate content of coatings. As, besides, the proportion of the isocyanate ingredient to that of the polyol ingredient may, in view of its high NCO content, be reduced, it is quite advantageous from the viewpoint of hygiene.

The polyurethane resin of the present invention may be put to, besides in use as coating material as above, a wide range of uses in various fields of industries.

For instance, those with an NCO/OH mole percentage in the range of 0.5 to 1.0 may be used to advantage for such fields as electrical insulation, capsulation, and manufacture of cast products.

When the NCO/OH mole percentage is in the range of 0.1 to 0.7, such compounds may be advantageously utilized for the manufacture of highly efficient adhesives or hardening agents. When, on the other hand, the NCO/OH mole percentage is greater, such compounds are suited for the manufacture of foam products. The foaming may be achieved by introducing a certain fixed amount of water or a blowing agent into the reaction products, by utilization of the known techniques of foaming.

In the following, the present invention will be explained in concrete terms by citing several examples of its embodiment and comparing them with a few examples of cases where the method of preparation is not quite the same. "Part or parts", of the compositions shown in the examples, means "part or parts by weight".

<Polymerization of 2, 6-diisocyanate caproic acid -β-isocyanate ethyl ester as a trifunctional isocyanate compound>

122.2 g (2.0 moles) of ethanolamine, 100 ml of o-dichlorobenzene and 420 ml of toluene were put in a four-mouthed flask fitted with a stirrer, a thermometer, a gas-introducing tube and a reflux condenser combined with a Dean-Stark apparatus; and by introducing into it hydrogen chloride gas under ice cooling, ethanolamine was converted into hydrochloride. Subsequently, 182.5 g (1.0 mole) of lysine-monohydrochloride was added; by heating the mixture to a reaction temperature of 80° C., hydrochloride of ethanolamine was caused to melt; and then by introducing into it hydrogen chloride gas, it was converted into lysine-dihydrochloride. It was continued to pass hydrogen chloride gas through the compound at a rate of 20 to 30 ml per min., with the reacting mixture heated to the reflux temperature (116° C.), and such temperature was maintained until there no longer was distillation of water. The reaction was let to continue for approximately 8 hours; thereafter, the solvent was decanted, and to the resultant oil-like substance was added a mixture of methanol and ethanol and a heat was applied. When such product was let to stand at room temperature, there was a deposition of crystals. By filtering out these crystals, 165 g of tertiary hydrochloride of lysine-β-aminoethyl ester having a melting point of 175° C., recrystallized from the mixture of methanol and ethanol, was obtained.

This trihydrochloride was pulverized and was then vacuum-desiccated at 50° C. for 8 hours. Subsequently, it was put in a four-mouthed flask provided with a stirrer, a thermometer, a gas-introducing tube and a reflux condenser, and by pouring 2.1 lit. of o-dichlorobenzene into it, it was made into a suspension. While stirring this suspension, phosgen was passed through it at a rate of 2.8 moles/hr., and the suspension was heated at 120° C. for 10 hours. When the temperature was gradually raised to 150° C. over a space of time of 6 hours, the suspensoid was practically wholly dissolved into the liquid. After cooling, the liquid was filtered and the solvent was eliminated by distillation under reduced pressure. The residue was distilled under nitrogen gas flow using an oil diffusion pump. The product: 140 g (yield 90%) of lysine isocyanate β-isocyanate ethyl ester (2, 6-diisocyanate caproic acid -β-isocyanate ethyl ester) (hereinafter to be called "LTI-E" for short) with a boiling point of 155 to 157° C./0.022 mmHg, a colorless, transparent liquid. Viscosity: 29 cps/20° C. NCO content: 47.1% by wt. (calculated value 47.2% by wt.).

Infrared spectrum: 2225 (isocyanate group), 1745 cm$^{-1}$ (ester carbonyl), 1460, 1355, 1200 cm$^{-1}$ (ester ether).

Nuclear magnetic resonance spectrum: 1.2 to 2.3 ppm (6H), 3.2 to 3.95 ppm (4H, -CH$_2$- NCO), 4.0 to 4.7 ppm

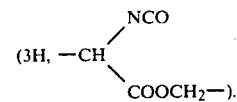

Mass spectrum: m/c 153

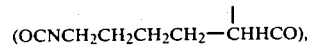

267 (molecular weight).

<Polymerization of 2, 6-diisocyanate caproic acid -γ-isocyanate propyl ester as a trifunctional isocyanate compound>

30 g (0.4 mole) of 3-aminopropanol and 100 ml of toluene were put in a four-mouthed flask fitted with a stirrer, a thermometer, a gas-introducing tube and a reflux condenser combined with a Dean-Stark apparatus; and by introducing into it hydrogen chloride gas, 3-aminopropanol was converted into a hydrochloride. Then, 36.6 g (0.2 mole) of lysine-monohydrochloride was added, and by introducing into the mixture hydrogen chloride gas again, it was converted into dihydrochloride of lysine. The reacting mixture was heated to the reflux temperature (110° C.) and, meanwhile, hydrogen chloride gas was passed through it. After the lapse of 11 hours, azeotropic distillation of water stopped. Toluene was eliminated from the resultant product, and ethanol was added to the residual oil-like substance and a heat was applied to the mixture. When such product was let to stand at room temperature, there was a deposition of crystals. By filtering out these crystals, 47 g of trihydrochloride mononhydrate of lysine-γ-aminopropyl ester having a melting point of 138° to 145° C., recrystallized from a mixture of methanol and ethanol, was obtained.

In the next place, 25 g of desiccated powder of trihydrochloride monohydrate of lysine-γ-aminipropyl ester, polymerized as above, and 300 ml of o-dichlorobenzene were put in a four-mouthed flask provided with a stirrer, a thermometer, a gas-introducing tube and a reflux condenser so as to form a suspension. Maintaining the temperature of the suspension at 150° C., phosgen was passed through it at a rate of 0.4 mole/hr. for 10 hours. In the next place, the temperature was gradually raised to 150° C., and the reaction was let to progress at such temperature for 4 hours. After cooling, the liquid was filtered and the solvent was eliminated by distillation under reduced pressure. The residue was made to undergo a molecular distillation. The product: 7.2 g (yield 34%) of lysine diisocyanate -γ-isocyanate propyl ester (2, 6-diisocyanate caproic acid -γ-isocyanate propyl ester) (hereinafter called "LTI-P" for short) with a boiling point of 153° to 155° C./0.036 mmHg, a light yellow liquid. Viscosity: 28 cps/20° C. NCO content: 44.6% by wt. (calculated value 44.8% by wt.).

Infrared spectrum: 2225 cm$^{-1}$(isocyanate group), 1740 cm$^{-1}$ (ester carbonyl), 1458, 1350, 1200 cm$^{-1}$ (ester ether).

Nuclear magnetic resonance spectrum: 1.2 to 2.4 ppm (8H), 3.2 to 3.8 ppm (4H, - C$\underline{H}_2$ -NCO), 3.9 to 4.6 ppm

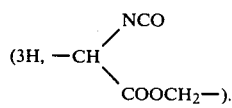

Mass spectrum: m/c 153

281 (molecular weight).

EXAMPLE 1

In a reactor provided with a stirrer, a thermometer, a condenser and a nitrogen gas introducing tube, after having sealed up nitrogen gas in it, 50 parts xylole and 50 parts butyl acetate were put, and the temperature was raised to 90° to 95° C.

| A mixture composed of: | |
|---|---|
| styrene | 34.0 pts. |
| n-butyl acrylate | 38.0 pts. |
| 2-hydroxyethyl methacrylate | 23.4 pts. |
| acrylic acid | 0.4 pts. |
| azobisisobutylonitrile | 1.2 pts. | was continuously dropped into the reactor over 3 hours, for polymerizing reaction. After having finished dropping the mixture of monomers, the compound was stirred for 1 hour while it was heated. Thereafter, 0.7 part of azobisisobutylonitrile was added 4 times at an interval of 30 minutes, and the compound was stirred for another hour to complete the whole reaction.

A resin solution thus obtained (a solution of polyacryl polyol) was colorless and transparent. Its Gardener bubble viscosity was "T" to "U" at 25° C., and the content of nonvolatile matter 50%. The molecular weight (Mn) was 14500; value of hydroxyl group 50; and calculated value of mean number of hydroxyl groups in a molecular 25.8.

This resin solution and LTI-E, which had been previously prepared, were uniformly blended in such a manner that the amounts of hydroxyl and isocyanate groups are equal. To this blended solution, a mixed thinner composed of toluole and cellosolve acetate, in the ratio of 65/35 pct. by wt., was added to adjust the fluidity to 20 sec. at +4 of the Ford cup. This diluted coating material was applied by spraying on a mild steel sheet previously coated with primer surfacer No. 114 (mfrd. by Kansai Paint Co.) and polished, in such a manner that the film thickness after drying would be approximately 40μ, and the coat was let to harden at room temperature (23° C.) for a week. The film coat obtained was, as is shown in Table 1, hard and had an excellent resistance to acid and hot water. In respect of anti-yellowing property, too, it was equal to a coat obtained by the use of non-yellowing type isocyanate prepolymers on the market.

The concentration of carbamide group was 15.7×10$^{-4}$ moles/g.; bridging parameter 501; and the percentage of hydrocarbon solvent in the solvents contained in the coating material 59.

EXAMPLE 2

A coat was formed in the same manner as Example 1, except for, in this example, the mixing ratio of polyacryl polyol solution and LTI-E was so modified as to make the NCO/OH mole percentage 0.5. Properties and efficiency of the coat obtained are shown in Table 1.

The concentration of carbamide group was 8.4×10$^{-4}$ moles/g.; bridging parameter 947; and the percentage of hydrocarbon solvent in the solvents contained in the coating material 59.

EXAMPLE 3

A coat was formed in the same manner as Example 1, except for, in this example, the mixing ratio of polyacryl polyol solution and LTI-E was so modified as to make the NCO/OH mole percentage 1.5 Properties and efficiency of the coat obtained are shown in Table 1.

The concentration of carbamide group was 22.0×10$^{-4}$ mole/g.; bridging parameter 558; and the percentage of hydrocarbon solvent in the solvents contained in the coating material 58.

EXAMPLE 4

In the same reaction apparatus as was used in Example 1, after having sealed up nitrogen gas in it, 80 parts xylole and 20 parts butyl acetate were put, and the temperature was raised to 80° to 85° C.

A monomer mixture composed of:

| A monomer mixture composed of: | |
|---|---|
| styrene | 25.0 pts. |
| methyl methacrylate | 25.0 pts. |
| n-butyl methacrylate | 21.0 pts. |
| n-butyl acrylate | 14.0 pts. |
| 2-hydroxyethyl methacrylate | 12.0 pts. |
| acrylic acid | 0.6 pts. |
| azobisisobutylonitrile | 1.2 pts. | was continuously dropped into the reactor over 3 hours. With the dropping finished, the compound was heated and stirred for 2 hours. Subsequently, 0.5 parts of azobisisobutylonitrile was added to the compound 4 times at an interval of 2 hours, and the compound was further heated and stirred for 3 hours to complete the whole polymerization reaction.

A resin solution thus obtained was colorless and transparent. Its Gardener bubble viscosity (25° C.) was "V" to "W", and the content of nonvolatile matter 50%. The molecular weight (Mn) was 11700; value of hydroxyl group 25; and calculated value of mean number of hydroxyl groups in a molecule 10.4.

With this resin solution, a coating material as prepared applied and was let to harden in the same manner as Example 1. As shown in Table 1, a coat having a good luster, with satisfactory rise of hardness, an excellent resistance to acid and hot water, was obtained. In respect of anti-yellowing property, too, the coat was as good as one obtained by the use of non-yellowing type isocyanate prepolymers available on the market, that is, no yellowing was observed.

The concentration of carbamide group was $8.4 \times 10^{-4}$ moles/g.; bridging parameter 1.067; and the percentage of hydrocarbon solvent in the solvents contained in the coating material 71.

EXAMPLE 5

To the resin solution obtained in Example 4, LTI-P, which had been previously prepared by polymerization, was added in such a manner that the amounts of hydroxyl and isocyanate groups are equal, and these were uniformly mixed together.

With this mixture, a coating material was prepared, applied and was let to harden in the same manner as Example 1. Properties and efficiency of the coat obtained are shown in Table 1.

The concentration of carbamide group was $8.5 \times 10^{-4}$ moles/g.; and bridging parameter 1031.

Control 1

A coat was formed in the same manner as Example 1, except for, in this case, the mixing ratio of polyacryl polyol solution and LTI-E was so modified as to make the NCO/OH mole percentage 2.50. Efficiency of the coat obtained is shown in Table 1.

The concentration of carbamide group was $32.4 \times 10^{-4}$ moles/g.; and bridging parameter 633.

Control 2

A coat was formed in the same manner as Example 4, except for, in this case, the mixing ratio of the resin solution and LTI-E was so modified as to make the NCO/OH mole percentage 0.5. Efficiency of the coat obtained is shown in Table 1.

The concentration of carbamide group was $4.4 \times 10^{-4}$ moles/g.; and bridging parameter 1,999.

Control 3

A coat was formed in the same manner as Example 5, except for, in this case, the mixing ratio of the resin solution and LTI-P was so modified as to make the NCO/OH mole percentage 0.5. Efficiency of the coat obtained is shown in Table 1.

The concentration of carbamide group was $4.4 \times 10^{-4}$ moles/g.; and bridging parameter 1,966.

TABLE 1

| Items for Assessment | | Example 1 LTI-E | Example 2 LTI-E | Example 3 LTI-E | Example 4 LTI-E | Example 5 LTI-E | Control 1 LTI-E | Control 2 LTI-E | Control 3 LTI-E |
|---|---|---|---|---|---|---|---|---|---|
| Weather resistance | "Weathaometer" 2500 hrs. | ◎ | O ~ ◎ | O | O | O | X | X | X |
| | Exposure outdoors 2 years | ◎ | O ~ ◎ | O | O | O | Δ ~ X | XX | XX |
| Gloss value, 60° | | 90 | — | — | 95 | — | — | — | — |
| Lead pencil hardness | | 3H | — | — | 2H | — | — | — | — |
| Shock resistance, 1 kg | | 35 cm | — | — | 20 cm | — | — | — | — |
| Erichsen test | | 6.0 | — | — | 7.5 | — | — | — | — |
| Cross-cut adhesion property | | 100/100 | — | — | 100/100 | — | — | — | — |
| Hot water resistance, 50° C. × 24 hrs | | O | — | — | O | — | — | — | — |
| Acid resistance, 40 vol. % H$_2$SO$_4$, 55° C. × 5 hrs | | O ~ Δ | — | — | O | — | — | — | — |
| Solvent resistance | Naphtha No.5/toluole: (6) (4) dipped for 10 min. | O | — | — | O | — | — | — | — |
| | "Xyloler" rubbing, 30 times | O | — | — | O ~ Δ | — | — | — | — |
| Yellowness | 0 hr | 1.3 | — | — | 3.1 | — | — | — | — |
| | UV * 200 hrs | 9.1 | — | — | 12.2 | — | — | — | — |
| Yellowing deg. | 200 hrs | 7.8 | — | — | 9.0 | — | — | — | — |
| Color difference Δ E(Lob) | 200 hrs | 4.7 | — | — | 5.5 | — | — | — | — |

* "Toshiba" Sterilizing Lamp GL-15 (15W), wave length 254 nm; strength of radiation at a distance of 20 cm = 600 μw/cm².
Pigment mixed: PWC 50%.
Hardening: A week, at room temperature (23° C.).
Legend -
◎ Very good.
O Good.
Δ Somewhat poor.
X Poor.
XX Very Poor.
— Not yet measured

EXAMPLE 6

Polyester polyol was prepared in the following manner:

| A mixture composed of: | |
|---|---|
| neopentyl glycol | 150.0 pts. |
| trimethylol propane | 22.1 pts. |
| adipic acid | 72.3 pts. |
| isophthalic acid | 123.2 pts. | was put in a reactor and was stirred for 30 minutes while heating it at 200° C. Then, until it reached an acid value of 10 and a CH value of 150, heating and stirring were continued at a temperature of 220° C., thus distilling water (approx. 15 hrs.). The molecular weight of the reaction product obtained was approximately 1000. By adding butyl acetate to this reaction product while it is being cooled, a solution with 70% solid matter content—a polyester polyol solution—was prepared.

In the next place, LTI-E was added to this polyester polyol solution in such a manner that the amounts of hydroxyl and isocyanate groups are equal, and these were uniformly mixed together. The calculated value of the concentration of carbamide group of this reaction product was $21.8 \times 10^{-4}$, and the calculated value of bridging parameter $E_c$ 790.

A film coat which was obtained by applying this coating mixture and letting it harden had an excellent luster and very good mechanical properties.

The percentage of hydrocarbon solvent in the solvents contained in said coating material was 48.

EXAMPLE 7

A two component type polyurethane coating consisting of "A" and "B" liquids, as undermentioned, was prepared.

"A" liquid: 171.6 parts polyacryl polyol of Example 1 and 57.2 parts titanium oxide were kneaded in a three-roller kneading machine to form a paste.

"B" liquid: 7.8 parts xylole was added to 14.2 parts LTI-E to form a triisocyanate solution with an NCO content of 30 wt.%.

By mixing equal amounts of "A" and "B" liquids, a mixture of NCO/OH=1 was obtained. By adding a thinner (toluole/cellosolve acetate=65/35 wt.pct.) to this mixture, the fluidity was adjusted to 15 sec. of the Ford cup #4. The content of nonvolatile matter in the solution was 55%. This diluted solution was applied by spraying on a mild steel sheet previously coated with a primer surfacer and polished, such as was used in Example 1, in such a manner that the film thickness after drying would be approximately 40μ, and the material was heated at 60° C. for 30 minutes. The coat obtained had a good luster and was superior in respect of acid and solvent resistance, too. The gloss retention after exposure out-doors for 18 months was approximately 70%, thus proving to have a very good weather resistance.

Concentration of carbamide group: $15.7 \times 10^{-4}$ moles/g.

Bridging parameter: 501

Percentage of hydrocarbon in the solvents: 57.1%.

EXAMPLE 8

To 14.2 parts LTI-E of the "B" liquid in the case of Example 7, methyl ethyl ketoxime in an amount equal to that of NCO group was added, and the mixture was stirred for 5 hours at room temperature to block NCO group of LTI-E. By adding 7.8 parts xylole to this blocked isocyanate, a triisocyanate solution with an NCO content of 30 wt.% at the time of dissociation was prepared.

By mixing this solution with "A" liquid of Example 7, a one-liquid type polyurethane coating was prepared.

The coating material was diluted with a thinner, and was applied on the base material in the same manner as Example 7. After the coating had set, the material was heated at 150° C. for 30 minutes to form a finished coat. The polyurethane resin coat obtained had a superior luster and showed a satisfactory weather resistance.

What we claim is:

1. A polyurethane resin having an excellent weather resistance, which is a reaction product obtained by causing
   (A) a polyol to react with
   (B) a trifunctional isocyanate which is expressed by the following general formula:

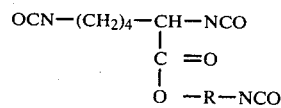

(R=a remnant of divalent hydrocarbon group with the carbon number of 2 or 3 (at an NCO/OH mole percentage of 0.5 to 2.0: and of which the concentration of carbamid group is $5 \times 10^{-4}$ to $50 \times 10^{-4}$ moles per gram of said reaction product, and the bridging parameter 150 to 1,500.

2. A polyurethane resin as claimed in claim 1, wherein the molecular weight of polyol is in the range of 500 to 5,000.

3. A film coat having an excellent weather resistance, whereof the main ingredient is a polyurethane resin which is a reaction product obtained by causing
   (A) a polyol to react with
   (B) a trifunctional isocyanate which is expressed by the following general formula:

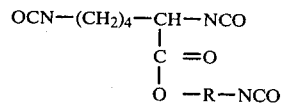

(R=a remnant of divalent hydrocarbon group with the carbon number of 2 or 3) at an NCO/OH mole percentage of 0.5 to 2.0; and of which the concentration of carbamide group is $5 \times 10^{-4}$ to $50 \times 10^{-4}$ moles per gram of said reaction product, and the bridging parameter 150 to 1,500.

4. A film coat as claimed in claim 3, wherein the molecular weight of polyol is in the range of 500 to 5,000.

5. A film coat as claimed in claim 3, wherein the polyol used is a polyester polyol of which the molecular weight is in the range of 500 to 1,000.

6. A film coat as claimed in claim 3, wherein the polyol used is a polyacryl polyol of which the molecular weight is in the range of 1,000 to 3,000.

7. A film coat as claimed in claim 3, wherein the NCO/OH mole percentage is in the range of 0.5 to 1.2.

8. A film coat as claimed in claim 6, wherein the polyacryl polyol used is a copolymer composed mainly of hydroxyalkyl acrylate and/or hydroxyalkyl methacrylate, and alkyl ester of acrylic acid and/or alkyl ester of methacrylic acid.

9. A two-component type polyurethane resin coating composed of:
   (A) a kneaded mixture of a polyol and a pigment which is added to it at need; and
   (B) a trifunctional isocyanate which is expressed by the following general formula:

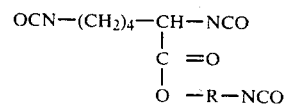

(R=a remnant of divalent hydrocarbon group with the carbon number of 2 or 3) and which has been diluted with a solvent at need, the amount of solvent in (B) being 0 to 50 pct. by wt.

10. A coating as claimed in claim 9, wherein more than 50 pct. by wt. of the solvent used and the thinner added at need is hydrocarbon solvents.

11. A one-component type polyurethane resin coating whereof the main ingredients are: a polyol and a trifunctional isocyanate which is expressed by the following general formula:

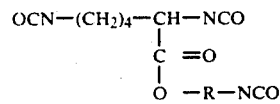

(R=a remnant of divalent hydrocarbon group with the carbon number of 2 or 3) and of which the isocyanate group has been blocked with a blocking agent, i.e., a blocked isocyanate.

12. A coating as claimed in claim 11, wherein more than 50 pct. by wt. of the solvent which is added at need is hydrocarbon solvents.

* * * * *